United States Patent [19]
Prichard et al.

[11] 4,137,330
[45] Jan. 30, 1979

[54] METAL SALT CATALYZED POLYMERIZATION OF (NPCl$_2$) OLIGOMERS

[75] Inventors: Mark S. Prichard, Clinton; Ashley S. Hilton, Massillon; Mark L. Stayer, Jr., Suffield; Thomas A. Antkowiak, Rittman, all of Ohio

[73] Assignee: The Firestone Tire & Rubber Company, Akron, Ohio

[21] Appl. No.: 876,385

[22] Filed: Feb. 9, 1978

Related U.S. Application Data

[63] Continuation-in-part of Ser. No. 788,480, Apr. 18, 1977, abandoned.

[51] Int. Cl.$^2$ ............................................. C01B 25/10
[52] U.S. Cl. .................................................. 423/300
[58] Field of Search .......................................... 423/300

[56] References Cited

U.S. PATENT DOCUMENTS

| | | | |
|---|---|---|---|
| 3,026,174 | 3/1962 | Paddock | 423/300 |
| 3,370,020 | 2/1968 | Allcock et al. | 260/32.6 N |
| 3,937,790 | 2/1976 | Allcock et al. | 423/300 |

FOREIGN PATENT DOCUMENTS 905315  9/1962  United Kingdom ..................... 423/300

*Primary Examiner*—O. R. Vertiz
*Assistant Examiner*—Wayne A. Langel

[57] ABSTRACT

A process for producing benzene-soluble substantially linear dichlorophosphazene polymer having the formula (NPCl$_2$)$_x$, in which x is greater than 20 and may be as high as 50,000 or higher, from a cyclic oligomer having the formula (NPCl$_2$)$_n$, in which n is from 3 to 9, particularly the trimer (NPCl$_2$)$_3$ or tetramer (NPCl$_2$)$_4$, in the presence of a small but significant amount of an inorganic salt, preferably a halide of a metal such as Cr, Ni, Co, Cu, Fe, Mn or Mg which affords control of the molecular weight and avoids the formation of large amounts of gel.

15 Claims, No Drawings

METAL SALT CATALYZED POLYMERIZATION OF (NPCL$_2$) OLIGOMERS

CROSS REFERENCE TO RELATED APPLICATIONS

This is a continuation-in-part of application Ser. No. 788,480 filed Apr. 18, 1977 abandoned.

This invention relates to improvements in the production of substantially linear (NPCl$_2$)$_x$ polymer from cyclic trimeric (NPCl$_2$)$_3$ or other low molecular weight dichlorophosphazene oligomers.

In one known practice of the process, e.g., as described in U.S. Pat. No. 3,370,020 issued Feb. 20, 1968, the polymerization proceeds smoothly during the initial stages until a substantial conversion has occurred, after which a benzene-insoluble gel forms which is not amenable to derivatization for the production of such useful products as are described in that United States Patent and in U.S. Pat. No. 3,515,688 issued June 2, 1970, and in an article published in the Scientific American in March, 1974 and elsewhere in the literature on polyphosphazenes.

The published prior art describes efforts which have been made to prevent the formation of the benzene-insoluble gel and to increase the percentage conversion of cyclic trimer to soluble linear polymer. Control of the molecular weight of the linear polymer has also been the subject of a number of investigations since the properties of the ultimate derivatives often depend on this.

A principal object of the present invention is to provide a process for producing benzene-soluble, substantially linear (NPCl$_2$)$_x$ polymer (x > 20) from (NPCl$_2$)$_n$ (n = 3 to 9) cyclic oligomers, principally trimer and tetramer in high yields and without the formation of benzene-insoluble gel, wherein the resulting linear polymer product has a molecular weight and viscosity in a desired range.

Another object of the invention is to provide a catalyst for the polymerization of slow or "ordinarily non-polymerizing" cyclic low molecular weight (NPCl$_2$)$_n$ oligomers to produce substantially linear (NPCl$_2$)$_x$ polymers of a desired molecular weight at high yields.

These and other objects will become more apparent from the description which follows.

The data shown in Table I below was obtained by conducting the polymerization of (NPCl$_2$)$_3$ as follows:

The indicated weight of CrCl$_3$ or other salt was added to 25 grams of purified hexachlorocyclotriphosphazene (NPCl$_2$)$_3$ which had been purified by recrystallization from hexane and the mixture was charged into a glass polymerization tube which was then evacuated, heated to melt the charge, cooled, subjected to vacuum again, cooled and then sealed, thereafter the sealed tube was heated to 250° C. and maintained at that temperature for the number of hours indicated in Table I. After completion of the run, the tube was opened unreacted cyclic oligomers were removed, and the dilute solution viscosity of the substantially linear (or polymeric) product, the % gel and the % conversion were determined. The results are shown in Table I.

TABLE I

| | Wt. % of Additive | Hrs. @ 250° C | % Conv. | DSV | % Gel |
|---|---|---|---|---|---|
| 1. | 0 (control) | 10 | 11.7 | 2.73 | 0 |
| 2. | 0 (control) | 20 | 21.2 | 3.50 | 16.5 |
| 3. | 0 (control) | 30 | 30.9 | 3.70 | 0 |
| 4. | 0.005% CrCl$_3$ . 6H$_2$O | 30 | 28.7 | 1.71 | 2.99 |
| 5. | 0.01% CrCl$_3$ . 6H$_2$O | 10 | 15.1 | 0.98 | 0 |
| 6. | 0.01% CrCl$_3$ . 6H$_2$O | 20 | 28.8 | 1.25 | 0 |
| 7. | 0.01% CrCl$_3$ . 6H$_2$O | 30 | 38.7 | 1.40 | 0 |
| 8. | 0.2% CrCl$_3$ . 6H$_2$O | 30 | 65.6 | 0.34 | 0 |
| 9. | 0.1% CrCl$_3$ | 30 | 46.8 | 1.45 | 1.17 |
| 10. | 0.2% CrCl$_3$ | 10 | 18.6 | 1.07 | 0 |
| 11. | 0.2% CrCl$_3$ | 20 | 42.5 | 1.12 | 1.91 |
| 12. | 0.2% CrCl$_3$ | 30 | 54.3 | 1.28 | 0.47 |
| 13. | 0.5% CrCl$_3$ | 30 | 46.0 | 0.83 | 0 |
| 14. | 0.18%$^a$ CoCl$_2$ 6H$_2$O | 22.1 | 49.0 | 0.48 | 4.8* |

$^1$Level equal to 0.2% CrCl$_3$ 6H$_2$O based on water.
*Gel due to additive ppt.

While not wishing to be bound by any specific explanation as to the difference between the effect of the hydrated compounds and the effect of the anhydrous compound, it appears that the hydrates may be functioning as sources of water and hence catalyzing the polymerization as described in U.S. Pat. No. 3,937,790 issued Feb. 10, 1976. If this is correct, the hydrated metal salts may be seen to offer a much more readily controlled means of introducing small amounts of water to the polymerization reaction.

From the data in Table I it will be readily apparent that in the absence of any modifier the % conversion is usually lower than when it is present, and it will also be seen that the hydrated salts are more effective in increasing the % conversion than the nonhydrated (anhydrous) salts. As will also be noted, polymers produced in the presence of such modifiers exhibit a lower dilute solution viscosity (DSV) than polymers produced in the absence of such modifiers. This provides significant advantages in the processing and use of such polymers. Small amounts of gel (< 3%) do not have any adverse effects on subsequent derivatizations. Large amounts of gel such as the 16.5% obtained in the control run would preclude successful derivatization.

Other metal halide salts which may be used in place of chromium chloride include halide salts of the following metals: Ni, Co, Cu, Mn, Fe, and Mg; particularly preferred salts being hydrates of metal chlorides or other halides.

The amounts of such inorganic metal halide salts which may be employed as modifiers in the polymerization process may vary somewhat. Thus, from about 0.002 to about 0.50 weight percent of such modifiers based on the weight of cyclic oligomer may in general be employed, with the preferred range being from 0.005 to 0.20 weight percent.

The purity of the starting cyclic material (NPCl$_2$)$_3$ will influence the effectiveness of the metal halides. In the past, when attempts have been made to thermally polymerize exceptionally pure trimer (NPCl$_2$)$_3$ some batches are found not to polymerize to any noticeable extent even after prolonged heating at 250° C. Thus the terms "slow" or "ordinarily non-polymerizing" as used herein refer to cyclic oligomers having a substantially higher degree of purity than those ordinarily or conventionally employed in the polymerization process.

Table II illustrates the catalytic effect produced by the addition of small amounts of $CrCl_3 \cdot 6H_2O$ to such a material.

TABLE II
EFFECT OF $CrCl_3 \cdot 6H_2O$ ON POLYMERIZATION OF "ORDINARILY NON-POLYMERIZING" TRIMER

| | Wt. % $CrCl_3 \cdot 6H_2O$ | Hrs. ® 250° C | % Conv. | Product Description |
|---|---|---|---|---|
| 1. | 0 | 26 | 4.2 | An oil-like substance |
| 2. | 0 | 24 | 4.8 | An oil-like substance |
| 3. | 0 | 168 | 7.7 | An oil-like substance |
| 4. | 0 | 168 | 7.6 | An oil-like substance |
| 5. | 0.005 | 31 | 45.7 | An elastomer, DSV = 1.12, 0.09% Gel |
| 6. | 0.01 | 24 | 32.8 | An elastomer, DSV = 1.17, 0% Gel |
| 7. | 0.01 | 24 | 35.1 | An elastomer, DSV = 0.94, 0.75% Gel |

Tables III (a) and III (b) illustrate the effect of various other metal halide salts on the polymerization of cyclic trimer. The desired influence on viscosity or molecular weight is clear. However, it will be noted from the data in the Tables that in several instances the rate of polymerization (as measured by percent conversion) of polymer prepared with modifier appears reduced as compared to the rate of polymerization of polymers prepared without modifier. This is very likely due to the fact that the starting trimer employed in these evaluations are of lesser purity and, therefore, polymerizes faster than the trimer employed in the preceding examples.

TABLE III (a)

| Additive | Wt. % | Hrs. ® 250° C | % Conv. | Inh. Visc. | % Gel |
|---|---|---|---|---|---|
| None | 0 | 14.9 | 35.3 | 2.87 | * |
| $NiCl_2 \cdot 6H_2O$ | 0.009 | 14.9 | 21.5 | 1.09 | 0.46 |
| $MgCl_2 \cdot 6H_2O$ | 0.007 | 14.9 | 26.4 | 1.09 | 1.42 |
| $CuCl_2 \cdot 2H_2O$ | 0.025 | 14.9 | 25.3 | 1.11 | * |
| $MnCl_2 \cdot 4H_2O$ | 0.011 | 14.9 | 29.6 | 1.18 | 0.60 |
| $CuCl_2$ | 0.2 | 14.9 | 18.4 | 1.59 | * |
| $CoCl_3 \cdot 6H_2O$ | 0.2 | 22.0 | 49.4 | 0.48 | 0.0 |

TABLE III (b)

| Additive | Wt. % | Hrs. ® 250° C | % Conv. | Inh. Visc. | % Gel |
|---|---|---|---|---|---|
| None | 0 | 23.0 | 48.0 | 1.32 | 0.46 |
| $CrCl_3 \cdot 6H_2O$ | 0.016 | 23.0 | 35.0 | 0.79 | 0.53 |
| $CrF_3 \cdot 3\frac{1}{2}H_2O$ | 0.0524 | 23.0 | 33.0 | 0.53 | 0.84 |
| $CoBr_2 \cdot 6H_2O$ | 0.0372 | 23.0 | 34.0 | 0.78 | 0.35 |
| $CoI_2 \cdot 2H_2O$ | 0.0532 | 23.0 | 53.0 | 0.62 | 0.37 |
| $FeCl_2 \cdot 4H_2O$ | 0.0272 | 23.0 | 39.0 | 0.72 | 0.21 |

The use of anhydrous metal salts to catalyze the reaction between $NH_4Cl$ and $PCl_5$ whereby $(NPCl_2)_3$ and other low molecular weight poly(dichlorophosphazenes) are products, as described in Canadian Pat. No. 614,267 issued Feb. 7, 1961 should not be confused with the present invention in which the product of such processes is the starting material of the process of the present invention, the product of which is a substantially linear $(NPCl_2)_x$ product in which a desired $x$ is achieved by monitoring the amount of metal salt added to the $(NPCl_2)_n$ cyclic oligomer which is to be polymerized.

We claim:

1. The process of polymerizing a slow or ordinarily non-polymerizing exceptionally pure cyclic oligomer having the structure $(NPCl_2)_n$, wherein $n$ is from 3 to 9, which comprises polymerizing said oligomer at a temperature of from 200°–300° C. under an inert atmosphere or in a vacuum in the presence of from about 0.002 to about 0.50 weight percent of a hydrated inorganic metal halide salt, whereby the percent conversion to the resultant linear polymer represented by the structure $(NPCl_2)_x$, wherein $x$ is between 20 and 50,000, is increased as compared to the percent conversion in the absence of said salt.

2. The process of claim 1 wherein said cyclic oligomer is $(NPCl_2)_3$ or $(NPCl_2)_4$.

3. The process of claim 1 wherein the inorganic metal halide salt is present in an amount of from 0.005 to 0.20 weight percent.

4. The process of claim 1 wherein the metal halide salt is a hydrated metal chloride.

5. The process of claim 1 wherein the metal of said metal halide salt is selected from the group consisting of nickel, cobalt, chromium, magnesium, copper, iron and manganese.

6. The process of claim 1 wherein the halide of said metal halide salt is selected from the group consisting of chloride, bromide, iodide and fluoride.

7. The process of claim 1 wherein the metal halide salt is chromium chloride.

8. The process of claim 1 wherein the metal halide salt is $CrCl_3 \cdot 6H_2O$.

9. The process of polymerizing cyclic oligomers represented by the formula $(NPCl_2)_n$ in which $n$ is from 3 to 9, which comprises polymerizing said oligomers at a temperature of 200°–300° C. under an inert atmosphere or in a vacuum in the presence of from about 0.002 to about 0.50 weight percent of a hydrated inorganic metal halide salt of a metal selected from the group consisting of nickel, cobalt, chromium, magnesium, copper, iron and manganese, whereby the dilute solution viscosity of the resultant linear polymer represented by the formula $(NPCl_2)_x$ in which $x$ is between 20 and 50,000 is reduced to a desired value as compared to the dilute solution viscosity of said polymer prepared in the absence of said salt.

10. The process of claim 9 wherein said cyclic oligomer is $(NPCl_2)_3$ or $(NPCl_2)_4$.

11. The process of claim 9 wherein the metal halide salt is a hydrated metal chloride.

12. The process of claim 9 wherein the halide of said metal halide salt is selected from the group consisting of chloride, bromide, iodide and fluoride.

13. The process of claim 9 wherein the metal halide salt is chromium chloride.

14. The process of claim 9 wherein the metal halide salt is $CrCl_3 \cdot 6H_2O$.

15. The process of claim 9 wherein said inorganic metal halide salt is present in an amount of from 0.005 to 0.20 percent by weight.

* * * * *

UNITED STATES PATENT OFFICE
CERTIFICATE OF CORRECTION

Patent No. 4,137,330  Dated January 30, 1979

Inventor(s) Mark Shelton Prichard, Ashley S. Hilton, Mark L. Stayer, Jr. and Thomas A. Antkowiak It is certified that error appears in the above-identified patent and that said Letters Patent are hereby corrected as shown below:

Column 2, Table I, in the footnotes:

Footnote "1" should be -- a --

Column 3, Table III(a)

footnote referring to the asterisk (*)
in the column marked "% Gel" has been omitted from
the patent and should be inserted to read:

* Had gel, filtered slowly but could not determine % gel. --.

Signed and Sealed this

Ninth Day of October 1979

[SEAL]

Attest:

RUTH C. MASON
Attesting Officer

LUTRELLE F. PARKER
Acting Commissioner of Patents and Trademarks